United States Patent
Laycock

(10) Patent No.: US 8,972,516 B2
(45) Date of Patent: *Mar. 3, 2015

(54) NETWORK BASED STORAGE AND ACCOUNTS

(71) Applicant: Larry R. Laycock, Alpine, UT (US)

(72) Inventor: Larry R. Laycock, Alpine, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,262

(22) Filed: Sep. 5, 2013

(65) Prior Publication Data

US 2014/0006544 A1    Jan. 2, 2014

Related U.S. Application Data

(63) Continuation of application No. 12/430,786, filed on Apr. 27, 2009, now Pat. No. 8,566,464.

(51) Int. Cl.
*G06F 15/167* (2006.01)
*H04L 29/08* (2006.01)
*G06F 21/62* (2013.01)
*G06Q 10/10* (2012.01)

(52) U.S. Cl.
CPC ........ *H04L 67/2842* (2013.01); *G06F 21/6245* (2013.01); *G06Q 10/10* (2013.01)

USPC ............ 709/213; 709/202; 709/203; 709/229

(58) Field of Classification Search
USPC ......................................... 709/202–203, 229
See application file for complete search history.

(56) References Cited

U.S. PATENT DOCUMENTS

| | | |
|---|---|---|
| 2005/0055232 A1* | 3/2005 | Yates ................................. 705/1 |
| 2007/0038563 A1* | 2/2007 | Ryzerski ......................... 705/40 |
| 2009/0157560 A1* | 6/2009 | Carter et al. .................... 705/80 |

* cited by examiner

*Primary Examiner* — Hitesh Patel
(74) *Attorney, Agent, or Firm* — Maschoff Brennan

(57) ABSTRACT

Managing information related to an entity. The method includes storing a cache of data particular to an entity. The cache of data is related to the entity and controlled by the entity. The data in the cache of data is organized into a number of distinct subject matters. Access is provided to a portion of the data to a third party. Access is provided based on the third party being a service provider providing services related to the one of the distinct subject matters. Access is provided while restricting access to other portions of the data to the third party. Additional data is received from the third party. The additional data is added from the third party to the cache of data and the additional data is organized into the one of the distinct subject matters such that the additional data is also related to and controlled by the entity.

20 Claims, 2 Drawing Sheets

NETWORK BASED STORAGE AND ACCOUNTS

CROSS-REFERENCE TO RELATED APPLICATIONS

This patent application claims the benefit of and priority to U.S. patent application Ser. No. 12/430,786, filed Apr. 27, 2009, which is incorporated herein by reference in its entirety.

BACKGROUND

Background and Relevant Art

Individuals often have a need to maintain large amounts of information about the individuals. For example, individuals may need to store medical records, insurance records, diet and exercise information, legal documents, etc. An individual may maintain information related to travel, work, scheduling, journaling, genealogy, etc. Additionally, individuals may maintain information related to pastimes and/or hobbies. For example, a music student may maintain lesson books and instructional notes from a music teacher. An athlete may maintain plays and training schedules. An individual may have multimedia content such as music, pictures, movies, etc.

In addition to an individual's need to maintain information, an individual may also have a need to provide information. For example, medical records may need to be provided to health care professionals. Diet and exercise information may need to be provided to personal trainers. Information about practice schedules and progress may need to be provided to teachers and coaches.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment including an information server. The method includes acts for managing information related to an entity. The method includes storing a cache of data particular to an entity. The cache of data is related to the entity and controlled by the entity. The data in the cache of data is organized into a number of distinct subject matters. Access to a portion of the data is provided to a third party. The portion of the data is organized into one of the distinct subject matters. Access is provided based on the third party being a service provider providing services related to the one of the distinct subject matters. Access is provided while restricting access to other portions of the data to the third party. Additional data is received from the third party. The additional data is added from the third party to the cache of data and the additional data is organized into the one of the distinct subject matters in a fashion such that the additional data is also related to the entity and controlled by the entity.

In another embodiment, an apparatus includes an information database for managing information related to an entity. The information database includes a cache of data particular to an entity. The cache of data is related to the entity and controlled by the entity. The data in the cache of data is organized into a number of distinct subject matters. The information database includes an interface configured to provide access to a portion of the data to a third party. The portion of the data is organized into one of the distinct subject matters. The interface is configured to provide access based on the third party being a service provider providing services related to the one of the distinct subject matters. The database is configured to restrict access to other portions of the data to the third party. The interface is further configured to receive additional data from the third party. One or more computer modules are configured to add the additional data from the third party to the cache of data and organize the additional data into the one of the distinct subject matters, such that the additional data is also related to the entity and controlled by the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to a personal database for aggregating data related to an entity. Additionally, embodiments may include functionality enabling the entity to allow access to certain portions of data in the database while restricting access to other portions of data in the database. For example, an entity may be an individual person. The database may store a myriad of data items related to the individual, such as for example, document libraries, medical and dental records, exercise history, weight history, movies owned by the entity, music owned by the entity, computer game data and software, automobile records for automobiles owned by the entity, financial data, business and/or home management data, family data, genealogy data, government agency data (such as DMV records, social security records, tax records, etc), etc.

Other entities may exist as well. For example, entities may be businesses or other organizations. As non-limiting examples, entities may be related to gaming industries, law enforcement, home and business security providers, education, government, insurance, travel industries, service industries (including hotels, car rental, restaurants, etc), etc. Many other entities are contemplated within the scope of the embodiments specifically set forth herein. Each of the entities may store in a personal database information related to and owned by the entity.

The database may be accessible over networks such as local area networks local to the entity and/or wide area networks, such as the Internet. Thus in some embodiments, the individual is able to access data in the database at a home computer or using any Internet connected device. Additionally, the individual may be able to allow access to service providers over network connections. For example, the individual may authorize access to medical records included in the database by a health care provider such as an emergency responder, doctor, pharmacist, dentist, etc. Further, service providers may generate additional data that can be uploaded by the service provider to the entity's database. This uploaded data then becomes owned and controlled by the entity, such that the entity can retrieve the data for personal use, business use, entertainment use and/or provide the data to other service providers.

Figure 1:
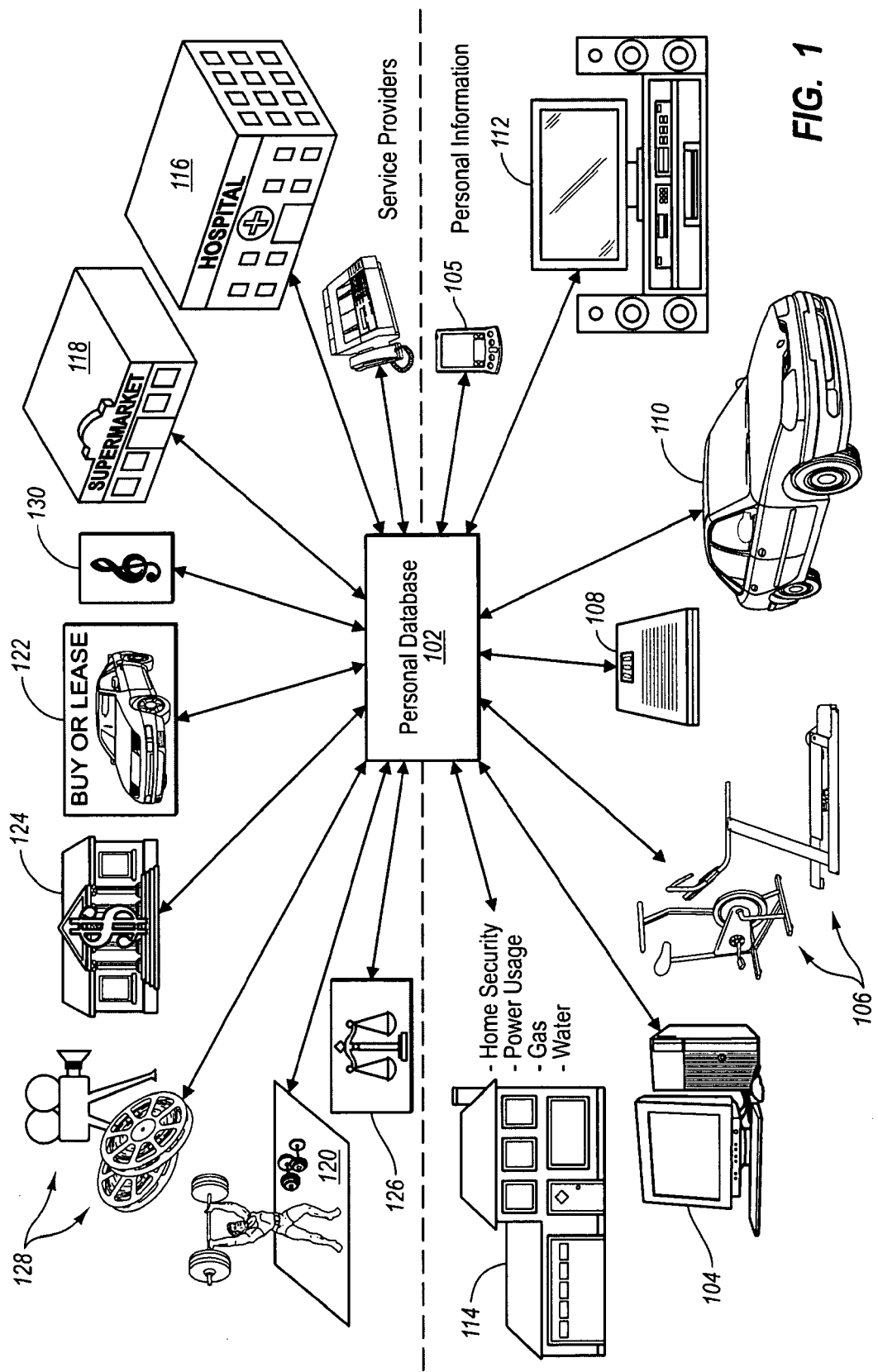
FIG. 1 illustrates an example environment where some embodiments may be practiced.

Referring now to FIG. 1, a more detailed example is illustrated. FIG. 1 illustrates a cache of data represented as a personal database 102. The personal database 102 may store information related to an entity. For example, if the entity is a person, the personal database 102 may store information such as financial information, medical information, government entity maintained information, home information, exercise and health information, automobile information, phone and address book information, calendar and schedule information, information related to entertainment such as music or movies owned by the person, or of interest to the person, etc. It should be noted that entities may be, but are not necessarily limited to persons. For example, an entity may be a business, non-profit organization, government organization, educational institution, law enforcement agency or other organization. An entity may be a computer system.

The personal database 102 may be implemented in a number of different fashions. For example, the personal database 102 may be implemented using a home computer physically accessible by an entity. Alternatively, the personal database 102 may be implemented using offsite computer storage facilities electronically accessible by an entity over a network connection.

Information in the personal database 102 may be added to or accessed by an entity in a number of different ways. For example, FIG. 1 illustrates a desktop computer terminal 104. The desktop computer terminal 104 allows the entity to access the personal database 102 to view information stored on the personal database 102 or to add information to the information on the personal database 102.

The desktop computer terminal functionality may be achieved using other devices as well. For example, internet connected televisions, set top boxes, and other devices may allow an entity to view and access information on the personal database 102.

In some embodiments, the desktop computer terminal 104 may store the personal database 102 directly on mass storage, such as on a hard drive, flash drive, system memory, and/or other storage at the desktop computer terminal 104. Thus, the entity can directly access the information at the desktop computer terminal 104. In alternate embodiments, the personal database 102 may be stored on another system in close proximity, such as within the same local area network (LAN) as the desktop computer terminal 104. In this embodiment, a user can access the personal database using the desktop computer terminal 104 through LAN access. In yet another alternative embodiment, the personal database 102 may be stored remotely, such as at a service provider providing remote storage of data. Often these service providers may make data available over wide area networks (WANs) such as the Internet. Thus, an entity may be able to access data at the personal database 102 through an internet connection between the desktop computer terminal 104 and an Internet connection, such as through DSL, cable internet, wireless internet, etc.

Notably, other computer systems may be used in place of the desktop computer terminal 104, such as media display devices (such as network televisions and/or set top boxes), laptop computers, network connected handheld computers, cellular telephones, and the like. Additionally, access may be provided to the personal database 102 through other special purpose devices when appropriate. For example, if an entity desires to access recommended exercise information provided by a health professional to the personal database 102, the user may be able to access such information directly on appropriately equipped exercise equipment.

Information related to the entity may be automatically provided to the personal database 102, without direct user interaction with respect to the particular data provided. FIG. 1 illustrates a number of examples of system components that can be used to provide such information.

For example, FIG. 1 illustrates exercise equipment illustrated at 106. In the example illustrated, a bicycle and a treadmill are shown. Other exercise equipment may additionally or alternatively be used. The exercise equipment 106 may be equipped with computing hardware and software and configured to transmit information to the personal database 102. For example, the exercise equipment 106 may include computer processor hardware, computer readable media hardware and network hardware. The exercise equipment 106 may further include sensors that can provide information to the processor indicating how the exercise 106 equipment is being used. For example, the sensors can provide an indication about the length of time exercise is performed, the intensity of the exercise, etc. Computer executable instructions stored on the computer readable media hardware can be executed by the processor facilitating collection of the information about how the exercise equipment 106 is being used and transmitting information based on the collected information over the network hardware to the personal database 102.

FIG. 1 illustrates a number of other devices that may also include appropriate hardware for providing information related to an entity to the personal database 102. For example, FIG. 1 illustrates a scale 108. The scale may transmit information about the weight of a person using the scale, where the weight is logged at the personal database 102 together with the date and time that a weight measurement took place. Other equipment may include similar functionality, such as blood pressure cuffs, fat calipers, heart rate monitors, pedometers, etc.

In another embodiment, connected gaming devices may provide data to the personal database 102. For example, a user may be able to store saved game progress, previous scores, created characters, etc.

FIG. 1 illustrates an automobile 110. The automobile 110 may include computer hardware configured to transmit information about the automobile 110 to the personal database 102. Such information may include maintenance information, such as when maintenance is performed and/or when maintenance is due. The information may include fuel economy information. If the automobile 100 includes tracking hardware, such as global positional satellite hardware, the information may include information related to locations where the automobile 110 has traveled. The information may include any information generated by the automobiles self diagnostic system.

FIG. 1 illustrates a home entertainment system 112. The home entertainment system 112 may include various pieces of computer hardware to facilitate transmission of home entertainment information related to the entity to the personal database 102. For example, the home entertainment system 112 may send and receive information about digital music, movies, images, etc. stored on the home entertainment system. Additionally, the personal database 102 may store digitized works, such as music, movies, images, etc., which can be transmitted to the home entertainment system 112.

FIG. 1 illustrates an automated home 114. The automated home may include computer hardware to communicate with the personal database 102. The automated home 114 can send information such as home alarm notifications, power usage, heating fuel usage, water usage, home irrigation (e.g. sprinkler) usage etc. For example, the automated home 114 can send information indicating what lights are in use at the automated home 114, how much power has been used at the automated home 114, warnings when alarm triggers have been tripped, etc.

The above devices are only examples of devices that may be connected to the personal database 102. Other devices may be alternatively or additionally connected to the personal database 102. As alluded to above, each of these devices and other devices connected to the personal database 102 may be used not only to send information, but also to receive information. The devices may receive information previously sent by an entity or automatically by appropriately configured equipment, or information previously sent by a service provider.

FIG. 1 illustrates a number of service providers that can access the personal database 102 and that can provide additional information to the personal database 102. An interface may be provided that provides access to a portion of the database 102. In particular, an entity can grant access to a portion of the personal database 102 appropriate to the service provider. For example, an entity may grant access to medical records stored in the personal database 102 to emergency responders, doctors, dentists, and/or other health care providers. The health care providers can use the accessed medical records to treat the entity, and may generate additional medical records based on the treatment. The additional medical records can be uploaded to the personal database 102, where the entity can then provide access to the additional medical records to different health care providers or the same health care providers at some later time.

Access to portions of the database 102 may be limited in a number of different fashions. For example, an entity may provide a service provider with a token to access the allowed portions of the personal database 102.

FIG. 1 illustrates a health care provider at 116. Health care providers may be, for example, doctors, dentists, emergency responders, or other health care providers. An entity may allow access to portions of the personal database 102 to the healthcare provider 116. For example, the entity may allow the healthcare provider 116 access to medical records stored in the personal database 102, such as for example medical records created by the health care provider 116 or other healthcare providers. In addition, the health care provider 116 may be allowed access to information such as weight information, exercise information or other information that may be helpful in medically treating the entity.

The health care provider 116 may add additional information to the personal database 102 as a result of treating the entity. The additional information added to the personal database 102 becomes data that is owned and controlled by the entity. Additionally, the information that the healthcare provider 116 provides to the personal database may be accessible by other service providers. For example, if the healthcare provider 116 provides prescription information, that information may be provided to a pharmacy and/or grocery store (e.g. grocery store 118) so that appropriate medications can then be obtained by the entity. In another example, certain medical information may be made available to health and fitness providers (e.g. fitness provider 120), such as personal trainers or other service providers so that an appropriate exercise regimen can be developed for the entity.

As alluded to, merchants, such as grocery store 118, may be granted access to portions of the personal database 102. In the example illustrated above, data provided by one service provider can be transmitted to another service provider to obtain goods and services for the benefit of the entity. In the example illustrated above, a prescription is transmitted from the health care provider 116 to the grocery store 118, through the personal database 102, such that the entity can retrieve the prescription from the grocery store 118 at a later appropriate time.

Additionally, the entity may upload data to the personal database 102 where the uploaded data includes information about desired goods and services. For example, an entity, by interacting with the desktop terminal 104 or the cellular phone 105, may upload a grocery list to the personal database 102. The grocery list can then be accessed by the grocery store 118 which has been granted access to the portion of data that includes the grocery list. The grocery store 118 then can prepare an order for pickup that includes items on the grocery list available at the grocery store 118. Additionally, because the grocery store has received prescription information from the health care provider 116, the prescription may be available for pick up by the entity together with items from the grocery list.

The entity may further grant limited access to the grocery store 118 (or other service providers in other examples) payment information such as credit card information or other financial information. For example, in one embodiment the entity may authorize direct pre-payment for goods by authorizing payments up to a limited amount to be paid via credit card, wire transfer, direct payment from checking accounts, or in another appropriate fashion.

As noted, a fitness provider 120 may have access to portions of the personal database 102. The fitness provider 120 may access information such as information provided by the exercise equipment 106 to determine exercise duration, type, and intensity that has been performed by the entity. Additionally, the fitness provider 120 may access information provided by the scale 108 or other health monitoring devices connected to the personal database 102. Additionally, an entity may upload to the personal database 102 information about fitness goals, or a fitness diary documenting eating habits, additional exercise not already documented by exercise equipment 106, and entities general perception of exercise effectiveness, etc. All or portions of this information may be available to the fitness provider 120 and can be used by the fitness provider 120 to tailor an exercise program for the entity.

The exercise program created for the entity by the exercise provider 120 can then be uploaded to the personal database 102. The exercise program created for the entity can then be accessed in a number of different ways. For example, the entity may access and review the exercise program using the desktop computer terminal 104, other media display device, the cellular telephone 105, or even connected exercise equipment with an appropriate display. Additionally, and/or alternatively, all or portions of the exercise program may be provided to the exercise equipment 106 and/or the health monitoring devices 108. The exercise equipment may include functionality for implementing an exercise program prescribed by the exercise provider 120. The health monitoring devices 108 may be able to provide visual or audible indications to an entity describing how the entity is doing in reaching certain health goals, based on the information provided by the exercise provider 120 to the personal database 102. In this fashion, an entity can integrate the exercise program in an appropriate way. In one example, the exercise equipment 106 may include functionality for increasing and decreasing one or more of time duration, resistance or intensity. This may be controlled based on exercise program information up loaded to the personal database 102. In particular, automatic controls may be implemented such that the entity does not need to manually adjust intensity or time for the exercise equipment 106, but rather the exercise programs stored in the personal database 102 can be used to automatically, without entity interaction, program the exercise equipment 106.

Notably, in some embodiments, the fitness provider 120 may also have access to grocery shopping list information and may add appropriate diet items to a grocery list for the entity. In particular, if the fitness provider 120 has constructed an eating and exercise program, the fitness provider 120 can provide this information to the personal database 102 for use by the entity or other service providers (e.g. the grocery store 118). The entity can simply allow this information to be provided to the grocery store 118, or may modify the information prior to transmitting to the grocery store 118 as deemed appropriate by the entity.

FIG. 1 also illustrates an automobile dealership 122. The automobile dealership 122 may be able to send and receive information to the personal database 102. For example, in one embodiment, information uploaded by the automobile 110 to the personal database 102 may be accessible by the automobile dealer 122. As such, when an entity brings the automobile 110 to the automobile dealer 122 for maintenance or service, the automobile dealer 122 may already have helpful information, including past service history, useful for providing appropriate service for the automobile 110. Additionally, the automobile dealer 122 may upload data to the personal database 102. This data may be accessible by an entity such as through the automobile 110, the desktop computer terminal 104 or the cellular telephone 105. Additionally or alternatively, information may be sent by the personal database 102 to the automobile 110 as appropriate.

FIG. 1 further illustrates a financial institution 124. The financial institution 124 may have access to information on the personal database 102 related to financial information, such as accounts to be paid, expected income, or other financial data. The financial institution 124 can also provide information to the personal database 102 such as information related to account balances, disbursements made, available credit limits, and the like. Information uploaded by the financial institution 124 may be available to the entity through the desktop computer terminal 104, the cellular telephone 105, or any other appropriate electronic display means.

FIG. 1 further illustrates a legal service provider 126. The legal service provider 126 may communicate with personal database 102. The legal service provider 126 may provide information such as executed legal documents, legal notices, etc.

FIG. 1 further illustrates a movies and music media service provider 128. The media service provider 128 may communicate with the personal database 102 to provide media to the personal database 102 such as movies, music, pictures, electronic books and magazines, etc. This information can be downloaded from the personal database 102 and accessed by the entity either through computer terminals such as desktop computer terminal 104, through the cellular telephone 105, or downloaded directly by the home entertainment system 112. Additionally, the media service provider 128 may have access to information uploaded to the personal database 102 by the home entertainment system 112. This can be used by the media service provider 128 to provide recommendations and suggestions to the entity for media that should be purchased or downloaded by the entity to the personal database 102. In some embodiments, the entity may have a particular subscription which allows suggested media to be downloaded automatically to the personal database 102. Media may be downloaded over the network, or downloaded from a DVR or satellite transmission. In another alternative embodiment, the media may be automatically downloaded to the personal database 102, but the entity will not be charged for the media unless the media is accessed by the entity. In some embodiments media downloaded to the personal database 102 may expire and thereafter be deleted from the personal database 102.

FIG. 1 further illustrates a lesson provider 130. The lesson provider 130 may represent entities such as educational entities, workplace training, music teachers, dance teachers, athletic coaches, etc. The lesson provider 130 may send and receive information to the personal database 102. For example, in one embodiment a lesson provider 130 may send lesson information such as sheet music, athletic plays, instructional videos, training materials, etc. to the personal database 102. The entity may then access the personal database 102 to retrieve the information provided by the lesson provider 130. The entity may upload information to the personal database 102 indicating that the lesson has been completed. Such information may include audio or video recordings of the lesson having been completed. For example, in one embodiment where the lesson provided by the lesson provider 130 is a music lesson, an entity may have a piano keyboard connected electronically to the personal database 102. Using the piano keyboard, the entity may generate a midi file of the entities performance of the lesson. Then music the lesson provider 130 can evaluate the midi file uploaded by the entity to the personal database to determine the entities progress in a musical learning endeavor. Similarly, a video of performance of athletic endeavors could be uploaded to the personal database and accessed by a trainer or coach to evaluate athletic performance.

Notably, the entity may have complete control over the data in the personal database 102. For example, the entity may provide service providers with keys or tokens to access portions of the database. In one embodiment, the entity can organize the database hierarchically into distinct subject areas, and sub-subject area of those subject areas. A provider's key may only be valid for certain subject areas and/or certain sub-subject areas. The provider's key can be revoked at any time by the entity. New keys can be provided to different entities. For example, if an entity selects a new doctor, the entity can indicate to the personal database 102 that the key should be revoked for the previous doctor and that a new key should be generated for the new doctor. The new key can be provided to the new doctor so that the new doctor can access appropriate portions of the database 102. As alluded to, the new key may only be valid for certain subject areas of the database, such as medical records and exercise history. The entity could expand the rights by providing access to shopping lists (as an indication of diet) or to other subject matters as the entity determines appropriate. Notably, any data entered into the personal database 102 by the previous doctor, becomes the property of the entity and the entity can revoke access to the previous doctor in spite of the previous doctor having generated or provided the data.

In another example, modern legal procedures and requirements have resulted in requirements to preserve electronic data when there is active litigation or a possibility of litigation. In addition, even traditional discovery requirements can result in large numbers of electronic documents to be reviewed. Thus, embodiments may allow an entity to grant permission to some electronically stored documents for review, while restricting access to other documents. This may be used to allow access to relevant documents while restricting access to irrelevant documents. In one illustrative example, an associate may be given authorization to access certain documents and can then review the documents. The associate can annotate the documents, such as providing information indicating that a document is privileged and should not be produced in litigation discover, or that a document is discoverable, but is for attorney's eyes only, or some other annotation. The annotations can then be added to the data which then become owned by the entity that provided access to the associate.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
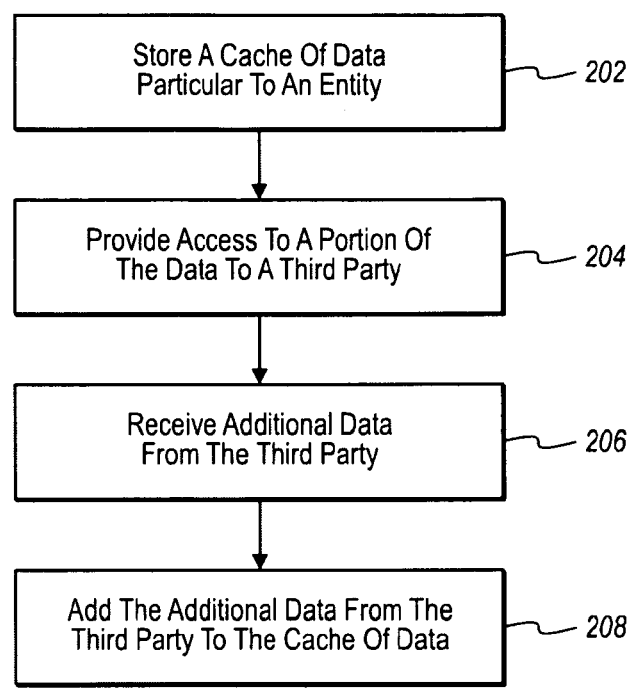
FIG. 2 illustrates a method of managing information related to an entity.

Referring now to FIG. 2, a method 200 is illustrated. The method 200 may be practiced in a computing environment including an information server. The method 200 includes acts for managing information related to an entity. The method includes storing a cache of data particular to an entity (act 202). The cache of data may be related to the entity and controlled by the entity. For example, an entity may be an individual or family, and data stored in the cache of data may be data related to the individual or family. Such information may relate to an individual's health and/or fitness, finances, home entertainment, leisure activities, etc. The data in the cache of data may be organized into a plurality of distinct subject matters. By way of example and not limitation, such subject matters may include health and/or fitness subject matter, home management subject matter, home entertainment subject matter, automobile subject matter, leisure subject matter, education subject matter, finance subject matter, travel subject matter, work subject matter, journaling subject matter, genealogy subject matter, scheduling subject matter, insurance subject matter, litigation subject matter, etc.

The method 200 further includes providing access to a portion of the data to a third party (act 204). The portion of the data to which access is provided may be organized into one of the distinct subject matters. Access may be provided based on the third party being a service provider providing services related to the one of the distinct subject matters. The access to the portion of the data may be provided, while restricting access to other portions of the data to the third party. For example, and referring once again to FIG. 1, information categorized into a health and/or fitness subject matter may be provided to health care provider 116, while restricting health care provider 116 from accessing finances, home entertainment, leisure activities, etc.

The method 200 further includes receiving additional data from the third party (act 206). The additional data may be generated as a result of the third party operating on the portion of data. For example, medical records may be provided to the health care provider 116, who may add additional information to the medical records, which are then returned to the personal database 102.

The method 200 further includes adding the additional data from the third party to the cache of data (act 208). The additional data may be organized into one of the distinct subject matters in a fashion such that the additional data is also related to the entity and controlled by the entity.

The method 200 may be performed where providing access to a portion of the data to a third party includes providing the third party with a digital key that can be used as a token to gain access to the portion of the data. For example service providers may be provided with passwords, smart cards, digital cryptographic proof, biometric proof, or other digital keys or personal identification that can be used to allow the service providers access to the personal database 102. The key provided may have limited functionality so as to limit the portions of the personal database 102 that can be accessed. The key can be revoked by the entity at any time so as to invalidate a service providers access privileges. Additionally, the personal database 102 may be associated with a user interface that allows an entity to select portions of the personal database 102 and to generate a key associated with those portions. Thus, an entity can select portions of the personal database to provide access to a service provider and provide the generated key to the service provider.

The method 200 may be practiced such that the data in the cache of data is organized into a plurality of distinct subject matters by organizing the data hierarchically where portions of the data are organized as sub-subject matters belonging to subject matters. For example, a health and/or fitness subject matter may have sub-subject matters directed to exercise programs, medical records, body weight records, body fat records, and/or diet information.

In some embodiments of the method 200, providing access to a portion of the data includes providing access to sub-subject matters without providing access to the subject matter to which the sub-subject matter belongs. For example, in the example above, access may be provided to exercise program information without providing access to medical records, body weight records, body fat records, and/or diet information.

Illustrating specific, but non limiting examples, at least a portion of the data in the cache of data may be organized into a health and/or fitness subject matter. Such data may include at least one of exercise programs, medical records, body weight records, body fat records, or diet information. At least a portion of the data in the cache of data may be organized into a home management subject matter. Such data may include at least one of home security information, power usage information, water usage information, or home heating use information. At least a portion of the data in the cache of data may be organized into a home entertainment subject matter. Such data may include at least one of multimedia content or multimedia content information. At least a portion of the data in the cache of data may be organized into an automobile subject matter. Such data may include at least one of diagnostic information or maintenance information.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or a desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising an information server, a method of managing information related to an entity, the method comprising:
   collecting data related to the entity without direct interaction by the entity with respect to the particular data collected;
   storing a cache of data particular to the entity, wherein the cache of data is controlled by the entity and the data in the cache of data is organized into a plurality of distinct subject matters;
   providing access to a portion of the data to a third party, wherein the portion of the data is organized into one of the distinct subject matters based on the third party being a service provider providing services related to the one of the distinct subject matters, while restricting access to other portions of the data to the third party;
   receiving additional data from the third party;
   adding the additional data from the third party to the cache of data;
   organizing the additional data into the one of the distinct subject matters such that the additional data is also related to the entity and controlled by the entity; and
   further organizing the additional data into a second of the distinct subject matters accessible to another third party based upon a second type of service provided.

2. The method of claim 1, wherein the providing access comprises providing the third party with a digital key that can be used as a token to gain access to the portion of the data.

3. The method of claim 1, wherein:
   the data in the cache of data is organized into a plurality of distinct subject matters by organizing the data hierarchically; and
   portions of the data are organized as sub-subject matters belonging to subject matters.

4. The method of claim 3, wherein the providing access comprises providing access to a sub-subject matter without providing access to the entire subject matter to which the sub-subject matter belongs.

5. The method of claim 1, wherein at least a portion of the data in the cache of data is organized into a health and/or fitness subject matter, and wherein such data includes at least one of exercise programs, medical records, body weight records, body fat records, or diet information.

6. The method of claim 1, wherein at least a portion of the data in the cache of data is organized into a home management subject matter and includes at least one of home security information, power usage information, water usage information, or home heating use information.

7. The method of claim 1, wherein at least a portion of the data in the cache of data is organized into a home entertainment subject matter and includes at least one of multimedia content or multimedia content information.

8. The method of claim 1, wherein at least a portion of the data in the cache of data is organized into an automobile subject matter and includes at least one diagnostic information or maintenance information.

9. The method of claim 1, further comprising providing a second portion of the data to one or more devices of the plurality of devices, wherein the second portion of the data automatically controls operation of the one or more devices during use by the entity and the second portion of the data is provided by action of the entity, automatically accessed by the one or more devices, or provided by the third party.

10. The method of claim 1, further comprising revoking access provided to the third party based on a change in the services provided by the third party.

11. A non-transitory computer-readable medium having encoded therein programming code executable by a processor to perform operations comprising:
 collecting data related to the entity without direct interaction by the entity with respect to the particular data collected;
 storing a cache of data particular to an entity, wherein the cache of data is controlled by the entity and data in the cache of data is organized into a plurality of distinct subject matters;
 providing access to a portion of the data to a third party, wherein the portion of the data is organized into one of the distinct subject matters based on the third party being a service provider providing services related to the one of the distinct subject matters, while restricting access to other portions of the data to the third party;
 receiving additional data from the third party;
 adding the additional data from the third party to the cache of data;
 organizing the additional data into the one of the distinct subject matters such that the additional data is also related to the entity and controlled by the entity; and
 further organizing the additional data into a second of the distinct subject matters accessible to another third party based upon a second type of service provided.

12. The non-transitory computer-readable medium of claim 11, wherein the providing access includes uses one or more digital keys that can be used as a token to gain access to the portion of the data.

13. The non-transitory computer-readable medium of claim 11, wherein the data in the cache of data is organized into a plurality of distinct subject matters by organizing the data hierarchically wherein portions of the data are organized as sub-subject matters belonging to subject matters.

14. The non-transitory computer-readable medium of claim 13, wherein the operations further comprise providing access to data in a sub-subject matter without providing access to the entire subject matter to which the sub-subject matter belongs.

15. The non-transitory computer-readable medium of claim 11, wherein the plurality of distinct subject matters includes one or more a health and/or fitness subject matter, a home management subject matter, a home entertainment subject matter, and an automobile subject matter.

16. The non-transitory computer-readable medium of claim 11, wherein the operations further comprise revoking access provided to the third party based on a change in the services provided by the third party.

17. A computer system comprising:
 a processor; and
 a tangible computer-readable storage medium communicatively coupled to the processor and having computer-executable instructions stored thereon that are executable by the processor to perform operations comprising:
 collecting data related to the entity without direct interaction by the entity with respect to the particular data collected;
 storing a cache of data particular to the entity, wherein the cache of data is controlled by the entity and the data in the cache of data is organized into a plurality of distinct subject matters;
 providing access to a portion of the data to a third party, wherein the portion of the data is organized into one of the distinct subject matters based on the third party being a service provider providing services related to the one of the distinct subject matters, while restricting access to other portions of the data to the third party;
 receiving additional data from the third party;
 adding the additional data from the third party to the cache of data;
 organizing the additional data into the one of the distinct subject matters such that the additional data is also related to the entity and controlled by the entity; and
 revoking access provided to the third party based on a change in the services provided by the third party.

18. The computer system of claim 17, wherein the operations further comprise further organizing the additional data into a second of the distinct subject matters accessible to another third party based upon a second type of service provided.

19. The computer system of claim 17, wherein the plurality of distinct subject matters includes one or more a health and/or fitness subject matter, a home management subject matter, a home entertainment subject matter, and an automobile subject matter.

20. The computer system of claim 17, wherein the operations further comprise providing a second portion of the data to one or more devices of the plurality of devices, wherein the second portion of the data automatically controls operation of the one or more devices during use by the entity and the second portion of the data is provided by action of the entity, automatically accessed by the one or more devices, or provided by the third party.

* * * * *